US007436566B2

(12) United States Patent
Kato et al.

(10) Patent No.: US 7,436,566 B2
(45) Date of Patent: Oct. 14, 2008

(54) OSCILLATING DEVICE, OPTICAL DEFLECTOR AND METHOD OF CONTROLLING THE SAME

(75) Inventors: Takahisa Kato, Tokyo (JP); Yukio Furukawa, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/603,060

(22) Filed: Nov. 22, 2006

(65) Prior Publication Data
US 2007/0115526 A1    May 24, 2007

(30) Foreign Application Priority Data
Nov. 22, 2005    (JP)    ............... 2005-337075

(51) Int. Cl.
*G02B 26/08*    (2006.01)
(52) U.S. Cl. ..................................... 359/224
(58) Field of Classification Search ......... 359/223–226, 359/290, 291, 872
See application file for complete search history.

(56) References Cited

U.S. PATENT DOCUMENTS

| 5,247,384 | A | 9/1993 | Inoue et al. ............... 359/199 |
| 6,445,481 | B2 * | 9/2002 | Aoki ......................... 359/224 |
| 6,803,843 | B2 | 10/2004 | Kato et al. ................. 335/78 |
| 6,850,349 | B2 | 2/2005 | Miyajima et al. ........... 359/199 |
| 6,924,915 | B2 | 8/2005 | Hirose et al. ............... 359/224 |
| 2006/0152785 | A1 | 7/2006 | Yasuda et al. .............. 359/199 |
| 2007/0041070 | A1 | 2/2007 | Ishibe et al. ............... 359/216 |
| 2007/0071055 | A1 | 3/2007 | Fujii ........................ 372/50.11 |

FOREIGN PATENT DOCUMENTS

| JP | 11-202226 | 7/1999 |
| JP | 2004-69731 | 3/2004 |

\* cited by examiner

*Primary Examiner*—Euncha P Cherry
(74) *Attorney, Agent, or Firm*—Fitzpatrick, Cella, Harper & Scinto (57) ABSTRACT

An oscillating device such as an optical deflector, by which a resonance frequency of an oscillating system can be adjusted and controlled. In one preferred embodiment, the oscillating device includes an oscillating system, a stationary member for holding the oscillating system, and a driving system having a coil, for driving the oscillating system. The oscillating system includes a movable element, a supporting member and a resiliently supporting portion, wherein the movable element is resiliently supported relative to the supporting member by the resiliently supporting portion for oscillating motion about an oscillation axis. The supporting member is fixed to the stationary member. The amount of heat generation of the coil can be controlled by applying, to the coil, a heating electric current of a frequency different from the natural oscillation mode frequency of the oscillating system, whereby the temperature of the oscillating system can be controlled.

12 Claims, 4 Drawing Sheets

FIG.1A  FIG.1B

DRIVING CIRCUIT 156

OSCILLATING DEVICE, OPTICAL DEFLECTOR AND METHOD OF CONTROLLING THE SAME

FIELD OF THE INVENTION AND RELATED ART

This invention relates to an oscillating device having a movable element resiliently supported for oscillating motion. In another aspect, the invention concerns an optical deflector using such oscillating device and a method of controlling the same. Optical deflectors according to the present invention may preferably be incorporated into projection display devices for projecting an image through deflective scan of light, or image forming apparatuses such as a laser beam printer or a digital copying machine having an electrophotographic process, for example.

For such optical deflectors, various proposals have been made with regard to optical scanning systems or devices for deflecting light by sine vibration of a reflection surface. Here, as compared with optical scanning systems having a rotary polygonal mirror (polygon mirror), optical scanning systems having an optical deflector arranged to perform sine vibration based on resonance phenomenon have advantageous features as follows. That is, optical deflectors can be made very small in size; the power consumption is low; and optical deflectors made of Si monocrystal through semiconductor manufacturing processes are theoretically very low in metal fatigue and have good durability.

In such optical deflectors based on resonance phenomenon, in some applications it is desirable to drive the deflector at a constant frequency. Hence, a few proposals have been made to maintain the resonance frequency constant against temperature changes in the environment.

One proposal is that an oscillating system having a movable plate resiliently supported by a pair of resilient torsion beams is fixed to a member that has a thermal expansion coefficient larger than that of the plate, such that stresses are produced in the resilient torsion beams in a direction to cancel any changes in the rigidity which may occur with a temperature rise (see Patent Document 1).

Another proposal uses an oscillating system having a movable plate resiliently supported by a pair of resilient torsion beams, the oscillating system being provided with a heat generating portion for temperature adjustment of the resilient torsion beams. Hence, even if the environment temperature changes, the temperature of the resilient torsion beams can be maintained constant for stabilization of the resonance frequency (see Patent Document 2).

[Patent Documents]
1: U.S. Pat. No. 6,850,349
2: Japanese Laid-Open Application No. 2004-69731

SUMMARY OF THE INVENTION

Conventionally, however, a heating element has to be added.

It is an object of the present invention to provide a unique and improved oscillating device.

In accordance with an aspect of the present invention, there is provided an oscillating device, comprising: a movable element; a supporting member; a resiliently supporting portion; a coil for driving said movable element; and a driving circuit connected to said coil, for supplying an electric current to said coil; wherein said movable element is resiliently supported relative to said supporting member by said resiliently supporting portion, for oscillation about a predetermined oscillation axis, and wherein said driving circuit is configured to superposedly apply, to said coil, a driving electric current for driving said movable element and a heating electric current of a frequency different from a frequency of natural vibration mode of said movable element.

In accordance with another aspect of the present invention, there is provided an optical instrument which may be an image display device or an image forming apparatus, for example, the optical instrument comprising: a light source; and an oscillating device as an optical deflector for changing the direction of reflection of light incident thereupon, wherein light from said light source is deflected by said oscillating device, such that at least a portion of the deflected light is projected on an image display member or a photosensitive member.

In accordance with a further aspect of the present invention, there is provided a method of controlling an oscillating device having a movable element, a supporting member, a resiliently supporting portion, a coil for driving the movable element, and a driving circuit connected to the coil, for supplying an electric current to the coil, said method comprising the steps of: supplying, to the coil, an electric current for driving the movable element; detecting, through a sensor, a displacement angle of torsion vibration of said movable element; calculating, on the basis of the detection through the sensor, an electric current level corresponding to a heating temperature necessary for bringing an oscillation frequency of said movable element close to a target oscillation frequency; and supplying, to the coil and in accordance with the calculated electric current level, a heating electric current of a frequency different from a frequency of natural oscillation mode of the movable element.

In accordance with a yet further aspect of the present invention, there is provided a method of controlling an oscillating device having a movable element, a supporting member, a resiliently supporting portion, a coil for driving the movable element, and a driving circuit connected to the coil, for supplying an electric current to the coil, said method comprising the steps of: supplying, to the coil, an electric current for driving the movable element; detecting a temperature of said oscillating device through a temperature sensor; calculating, on the basis of the detection through the temperature sensor, an electric current level corresponding to a heating temperature necessary for bringing an oscillation frequency of said movable element close to a target oscillation frequency; and supplying, to the coil and in accordance with the calculated electric current level, a heating electric current of a frequency different from a frequency of natural oscillation mode of the movable element.

In an oscillating device as an optical deflector for performing optical scan or in a controlling method therefor, according to these aspects of the present invention, a coil of the driving means may function also as a heating element. Thus, the resonance frequency, for example, of the movable element can be adjusted and controlled without the addition of any special heating element.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Briefly, an oscillating device according to one preferred embodiment of the present invention may include an oscillating system, a stationary member for holding the oscillating system, driving means having a coil, for driving the oscillating system, and a driving circuit for supplying an electric current to the driving means having the coil. The oscillating system of this embodiment may include a movable element, a supporting member and a resiliently supporting portion that comprises one or two torsion springs. The movable element is resiliently supported by the resiliently supporting portion (torsion spring means) relative to the supporting member, for torsional oscillation about a torsional axis (predetermined oscillation axis). The supporting member is fixed to a stationary member. With regard to the movable element, a plurality of movable elements may be provided in a nest relation or in series (U.S. Patent Application Publication No. 2006/0152785). In this preferred embodiment, an electric current of a frequency of natural oscillation mode may be applied to the coil of the driving means to drive the movable element. In addition to this, a heating electric current of a frequency different from the frequency of natural oscillation mode of the oscillating system may be applied to the coil to control the heat generation amount of the coil, to thereby adjust the temperature of the oscillating system. More specifically, a heating electric current of a frequency different from the frequency of natural oscillation mode of the oscillating system may be applied to the coil of the driving means to control the heat generation amount of the coil, by which the frequency of natural oscillation mode about the aforementioned predetermined oscillation axis can be adjusted toward a target frequency.

In this preferred embodiment of the present invention, the coil may be disposed on a stationary member and the driving means may comprise the coil and a permanent magnet provided in the oscillating system. Alternatively, however, the coil may be disposed on the movable element and the driving means may comprise the coil and a permanent magnet disposed outside the oscillating system. If the coil that produces heat is directly disposed on the movable element, the temperature of the torsion spring can be efficiently adjusted in accordance with changes in external condition, such that the frequency of natural oscillation mode of the object of driving can be adjusted and stabilized to a desired level.

In the structure described above, there are a few methods for performing temperature adjustment through the coil control, to carry out the adjustment and stabilization of torsion vibration about the torsional axis of the movable element having a reflection surface. In this preferred embodiment, the temperature of the oscillation system may be monitored by use of a temperature sensor, and an electric current level corresponding to a heating temperature necessary for bringing the oscillation frequency of the movable element close to a desired target oscillation frequency may be calculated by the driving circuit on the basis of the detection made by the temperature sensor. Then, a heating electric current corresponding to this electric current level is applied by the driving circuit to the coil, whereby the oscillating device can be adjusted to a predetermined temperature or frequency. The temperature sensor may comprise a thermo couple disposed near the oscillating system.

A position sensor may be used and, in that occasion, the displacement angle of the torsion vibration of the movable element may be detected by this position sensor. On the basis of the displacement angle information, an electric current level corresponding to the heating temperature necessary for bringing the oscillation frequency of the movable element close to a desired target oscillation frequency may be calculated by the driving circuit. Then, a heating electric current corresponding to this electric current level is applied to the coil by the driving circuit, to adjust the frequency of natural oscillation mode. Through this adjustment, the driving frequency of the oscillating-system driving signal of the driving means can be adjusted to a frequency about the natural oscillation mode and the driving of the movable element can be stabilized. With regard to detection of a frequency deviation, as an example, the passing timing of a certain displacement angle of the oscillating movable element may be detected by use of an appropriate detecting means and, based on this, the phase of the movable element and any deviation thereof from a desired value may be detected. The position of the movable element can be detected by providing a piezoelectric resistance at the resiliently supporting portion and by calculating the displacement angle of the movable element on the basis of a signal output from the piezoelectric resistance. Another position detecting means may be a method in which light reflected by the movable element is detected by use of a photodetector and the displacement angle of the movable element is calculated on the basis of a signal from the photodetector.

Alternatively, the temperature may be adjusted gradually by means of the coil, and a desirable adjusted position as an extreme value for the displacement angle may be determined.

Furthermore, in this preferred embodiment, it is a possible alternative that a heating electric current may be injected into the coil previously to heat the oscillating system to assure that the temperature at the time of driving is sufficiently higher than the ambient temperature. Adjusting the frequency of natural oscillation mode after that is very effective to reduce the heat generation amount of the coil.

Furthermore, although in the structure described above the oscillating system is torsionally oscillated about the torsional axis by natural oscillation mode, the oscillating system may be flexurally oscillated around a predetermined axis. In that occasion, in the structure shown in FIG. 3, for example, the movable element flexurally oscillates about a flexural oscillation axis inside the plane of the sheet of FIG. 3, passing through the connection and perpendicular to a flexural spring, and in a direction perpendicular to that plane. In this case, as an example, the driving means may comprise a coil of the oscillating system and a stationary-member-side magnet. The magnetic field of the magnet may be produced near the free end portion of the oscillating system of cantilever structure, in upward and downward directions in FIG. 3, inside the plane of the sheet of FIG. 3, and it may be applied to the coil (see the coil of FIG. 3) disposed at the free end portion of the oscillating system.

The deflector of this preferred embodiment is not limited to one for deflecting light. It may be used to deflect electromagnetic waves such as infrared rays or ultraviolet rays, for example.

Now, preferred embodiments of the present invention will be described in greater detail, with reference to the attached drawings.

Embodiment 1

Figure 1A:
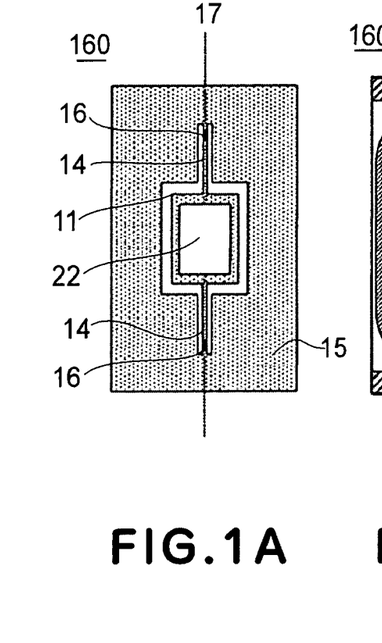
FIG. 1A is a top plan view of an optical deflector according to a first embodiment of the present invention.
Figure 1B:
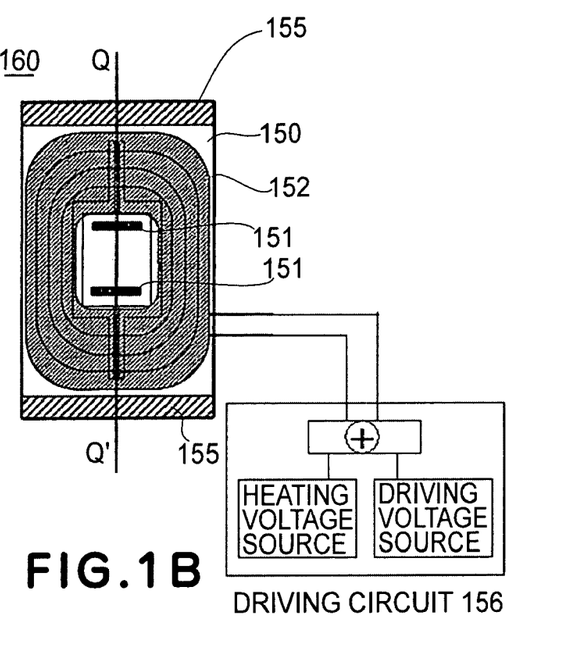
FIG. 1B is a top plan view of driving means for the optical deflector according to the first embodiment of the present invention.

FIGS. 1A and 1B are top plan views, respectively, for explaining an optical deflector according to a first embodiment of the present invention. As shown in FIG. 1A, the optical deflector of this embodiment comprises a movable element 11 having a reflection surface 22 for optical deflection, a supporting member 15 which is a mechanical ground member, and a pair of torsion springs 14 configured to couple them and to resiliently support the movable element 11 for torsional oscillation about a torsional axis 17. Here, the reflection surface 22, the movable element 11, the supporting member 15 and the torsion springs 14 provide an oscillating system 160. This oscillating system 160 has a natural oscillation mode of approximately the same torsional direction as of the driving frequency, about the torsional axis 17.

The oscillating system 160 of this embodiment is produced integrally from a monocrystal silicon substrate through a photolithographic process and a dry etching process, conventionally included in semiconductor manufacturing processes. Hence, the processing precision is very high and a quite small oscillation system can be produced. Furthermore, since monocrystal silicon has large Young's modulus and small density, deformation of the movable element 11 due to the dead weight thereof during the driving is very small and, furthermore, an oscillating system having high amplitude amplification factor during oscillation with the frequency of natural oscillation mode can be provided. In this example, the movable element 11 has a size 3 mm in a direction perpendicular to the torsional axis 17 and a size 4 mm in a direction parallel to it.

The reflection surface 22 formed on the movable element 11 functions to deflectively scan the light from a light source, not shown in the drawings. In this example, the reflection surface 22 is made of aluminum, having been formed there by vacuum vapor deposition. The reflection surface 22 may be made of a different material such as gold or copper, for example. A protection film may be provided at the outermost surface thereof.

Each torsion spring 14 is provided with a piezoelectric resistance 16. Such piezoelectric resistance can be produced by dispersing phosphorous into p-type monocrystal silicone, for example.

Figure 2:
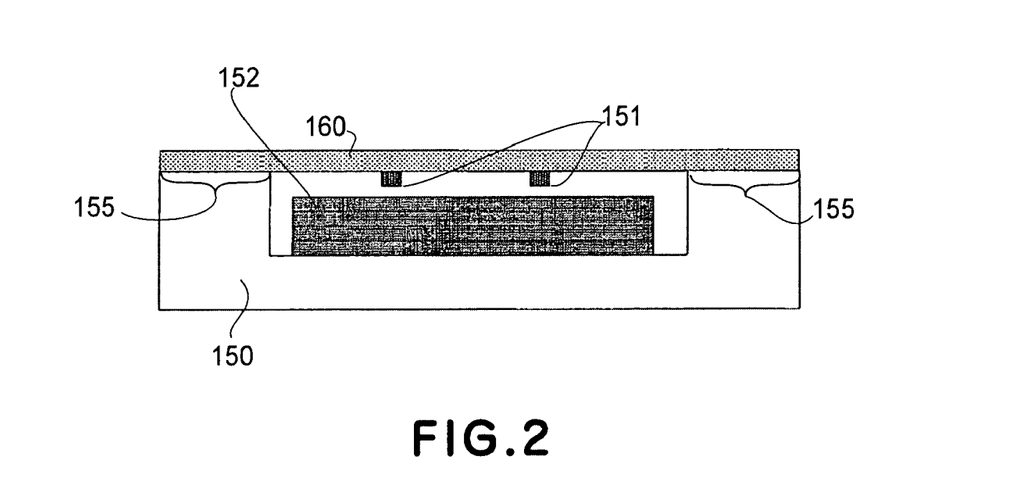
FIG. 2 is a sectional view of the optical deflector according to the first embodiment of the present invention, taken along a line Q-Q' in FIG. 1B.

FIGS. 1B and 2 best illustrate a stationary member 150 and driving means in accordance with this embodiment. FIG. 1B is a top plan view (where the oscillating system 160 are shown superposedly), and FIG. 2 is a sectional view taken along a line Q-Q' in FIG. 1B. As shown in these drawings, the driving means of this embodiment comprises two permanent magnets 151 bonded to the movable element 11 (magnets 151 are bonded to a rear surface remote from the surface where the reflection surface 22 is formed) and a stationary coil 152 fixed to the stationary member 150. Each permanent magnet 151 is a metal magnet having prismatic shape, with a length of about 1 mm and a sectional size of 150 μm×105 μm. The direction of magnetization of each permanent magnet 151 extends along the lengthwise direction (a direction approximately perpendicular to the torsional axis 17), and the magnets are fixed to the movable element 11 by means of an adhesive agent. As shown in FIG. 2, the stationary member 150 properly holds the positions of the oscillating system 160, the permanent magnets 151 and the stationary coil 152. In this example, the stationary member 150 is made of aluminum. However, it may be made of any other ordinary metal material such as, for example, an alloy that contains iron or an alloy that contains copper.

In driving operation, a driving AC electric current is applied to the stationary coil 152 from the driving circuit 156, and the coil produces a magnetic field in a direction approximately perpendicular to the sheet of FIG. 1B. Due to this magnetic field, a torque about the torsional axis 17 is produced in the permanent magnets 151, whereby the oscillating system 160 is driven. In the illustrated example, there is no iron core at the center of the coil 152. If an iron core is used there, the magnetic flux density increases and, furthermore, the heat conductivity between the stationary coil 152 and the stationary member 150 is improved.

On the other hand, as shown in FIGS. 1B and 2, the supporting member 15 is fixed to the stationary member 150 at junctions 155 shown by hatching. Thus, the oscillating system 160 is supported at its opposite end portions by the stationary member 150 to which the supporting member 15 is fixed. At the junctions 155, an adhesive agent having particularly high heat conductivity is used. Therefore, the supporting member 15 and the stationary member 150 have good thermal contact with each other.

Figure 4:
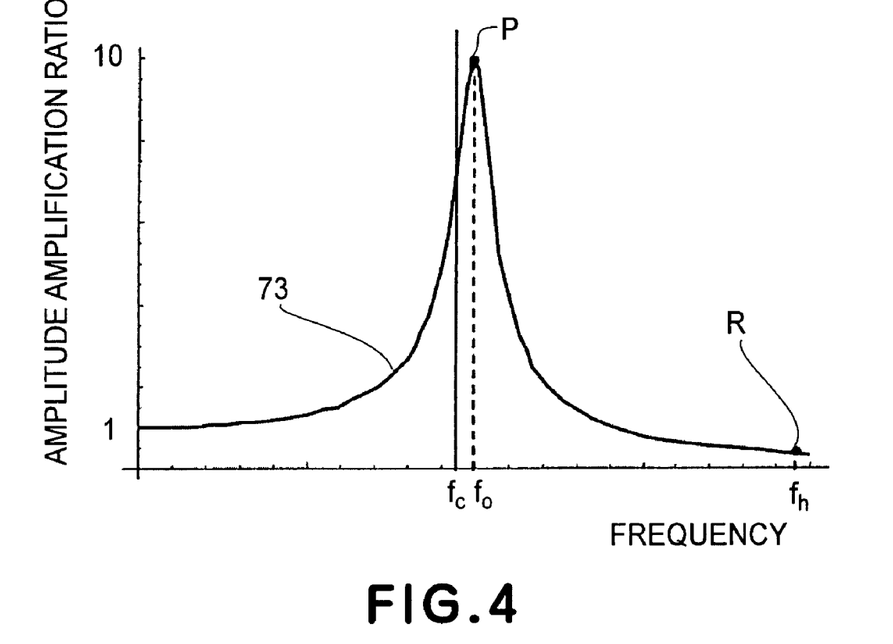
FIG. 4 is a graph for explaining the driving of an optical deflector of the present invention and the principle of frequency adjustment therefor.

Next, the principle of driving and the principle of frequency adjustment in the optical deflector according to this embodiment of the present invention will be explained. The oscillating system 160 of this embodiment can be regarded as a single-freedom oscillating system with respect to torsional oscillation about the torsional axis 17. FIG. 4 illustrates the frequency response characteristic of this oscillating system. In FIG. 4, the axis of abscissa corresponds to the frequency while the axis of ordinate corresponds to the amplitude amplification ratio. A curve 73 shows how many times the amplitude of torsion oscillation of the movable element 11 is amplified as compared with a case wherein there is no resonance driven. It is seen from the drawing that the curve 73 shows the frequency characteristic of typical single-freedom oscillating system. At frequency f0, there is a natural oscillation mode, and a peak P appears. The curve 73 is a curve which is obtainable when, for explanation, the attenuation ratio is made large so that the amplification ratio of the peak P at the frequency f0 of the natural oscillation mode is about 10. Actually, in the oscillating system 160 of this embodiment, the amplification ratio is about 250.

Furthermore, in FIG. 4, the frequency fc is a desired driving frequency which is required particularly when the optical deflector is used in some optical instruments, for example. In the case of FIG. 4, due to machining errors or changes in environmental temperature, for example, there is a small deviation between the natural oscillation mode frequency f0 and the desired target driving frequency fc.

The driving circuit 156 applies an AC electric current of a target driving frequency fc to the stationary coil 152, thereby to drive the oscillating system 160. On the other hand, the driving circuit 156 produces an AC electric current of a frequency fh different from the driving AC current described above, and it applies the same to the stationary coil 152. The frequency fh is a frequency which is sufficiently higher than the frequency f0 and which does not correspond to any natural oscillation modes other than the aforementioned natural oscillation mode about the torsional axis 17. Specifically, fh should desirably be about five to ten times higher than f0. It is seen from FIG. 4 that, by this electric current, the oscillating system 160 remains approximately non-actuated (see point R), as compared with the peak P. On the other hand, due to the DC resistance component of the stationary coil 152, Joule's heat of an amount corresponding to the amplitude of the AC current of frequency fh is produced in the stationary coil 152. Hence, by controlling the amplitude of the AC current of frequency fh, the heat generation amount of the stationary coil 152 can be controlled without an influence to the drive of the oscillating system 160.

Here, the frequency f0 of natural oscillation mode has a property that it decreases with a temperature rise of the oscillating system 160 and the stationary member 150. Therefore, by applying the electric current while increasing the amplitude of the AC current of frequency fh, the heat generation amount of the stationary coil 152 can be increased. Also, by heating the oscillating system 160 and the stationary member 150 by use of that heat, the point P can be shifted close to the frequency fc.

In this embodiment, the displacement angle of the movable element is detected through the piezoelectric resistances 16 and, on the basis of the detected angle, the driving circuit 156 calculates the value for a heating electric current necessary for bringing the target driving frequency fc and the natural oscillation mode frequency f0 approximately into coincidence with each other. In this example, preferably fc should be within a range of about ±0.1% of f0. Here, the value of heating electric current takes an AC current amplitude value of the optimum frequency fh. Then, an electric current of frequency fh corresponding to the calculated electric current value is applied from the driving circuit 156. Through this control procedure, a large deflection angle is obtainable with a small torque. Additionally, the power consumption can be saved.

In the manner described above, the frequency and the amplitude can be adjusted and controlled through the driving circuit 156 and the stationary coil 152. In the case of FIG. 4, the frequency f0 is slightly higher than the frequency fc. However, even if the frequency f0 is lower than the frequency fc, once the temperature during the driving is made sufficiently higher than the ambience temperature, it is possible to adjust the frequency f0 toward the frequency fc by reducing the heat generation amount of the stationary coil 152.

The change of frequency f0 with the temperature is determined mainly by the relationship between a change in Young's modulus of the material that constitutes the torsion spring 14 and the tensile stress or compressive stress to the torsion spring 14 in the direction of the torsional axis 17 due to the difference in thermal expansion coefficient between the stationary member 150 and the oscillating system 160. Therefore, although in some cases the frequency f0 may have a property of increasing with the temperature rise, even in such cases it is possible to adjust the frequency f0 by adjusting the heat generation amount of the stationary coil 152 inversely to the relationship described hereinbefore.

With regard to the frequency fh, the influence to the driving can be smaller if fh is made sufficiently high as compared with the frequency f0. On the other hand, if fh is made lower than the frequency h0, although in this case the influence to the driving will increase slightly, because of the inductance characteristic of the coil 152 the coil can be energized with a smaller voltage.

In this embodiment, the stationary coil 152 of the driving means is used to perform the heating. With this structure, the process of forming a heating element such as a heater wire for frequency adjustment can be omitted and, therefore, the optical deflector can be produced with a reduced cost. Since the torsion spring 14 has no heating element, it is possible to avoid the load of repeated stress due to the driving of the oscillation system 160. Thus, malfunctions due to breakage or deterioration of the heating element can be avoided, and the life duration of the optical deflector can be prolonged. In addition to this, there is no influence upon the torsion rigidity or breaking characteristic of the torsion spring 14, and this further improves the life duration of the oscillating system 160.

Furthermore, if a material having a large difference in thermal expansion coefficient as compared with the oscillating system 160 is used for the stationary member 150, the rate of change of the frequency with the temperature can be increased more. In such case, a large frequency change is obtainable with smaller voltage consumption. Moreover, since in this embodiment the oscillating system 160 is made of monocrystal silicon, the heat conductivity there of is excellent. Hence, uniform temperature rise of the oscillating system 160 can be achieved easily by heat generation at the stationary coil 152.

Embodiment 2

Figure 3:
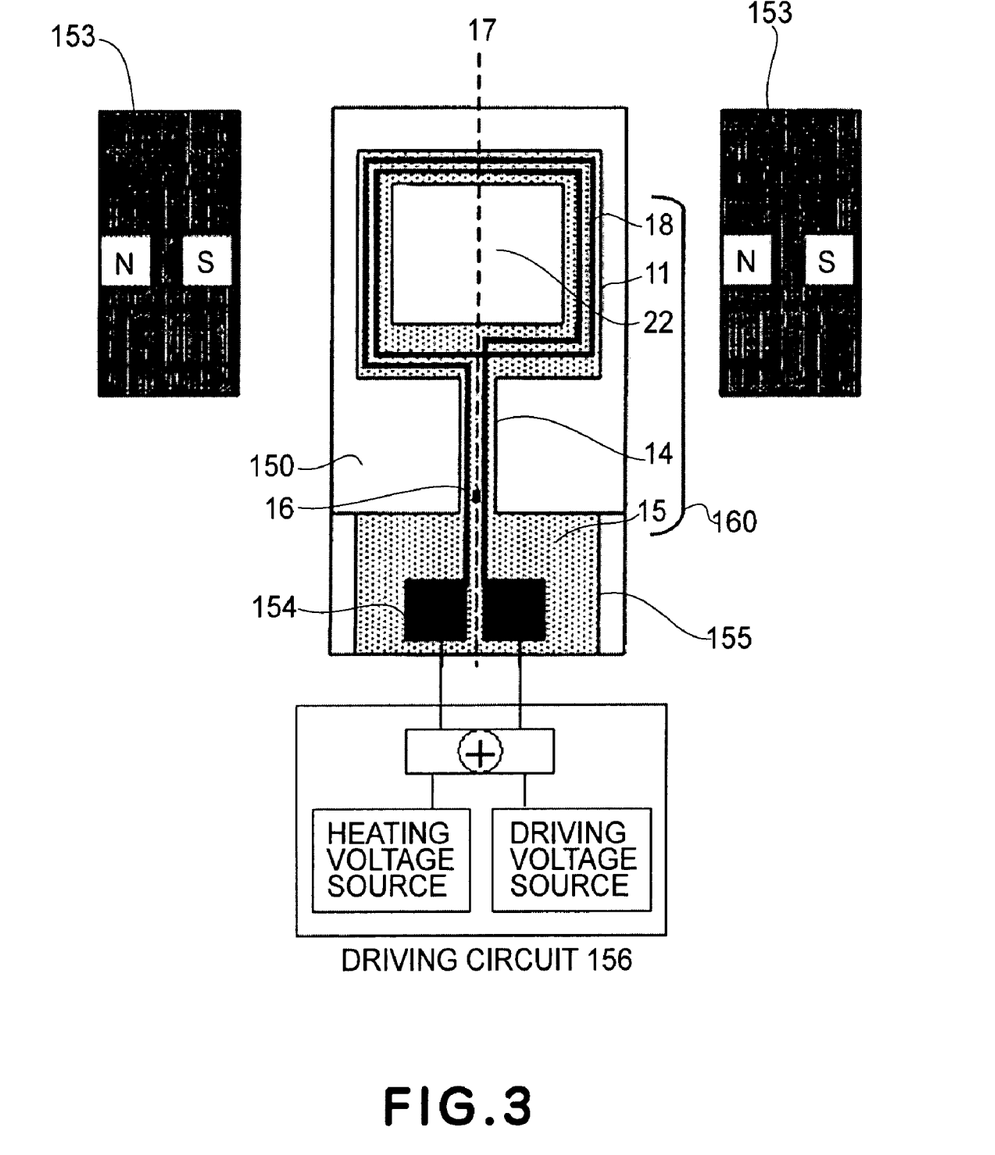
FIG. 3 is a top plan view of an optical deflector according to a second embodiment of the present invention.

FIG. 3 is a top plan view, showing an optical deflector according to a second embodiment of the present invention. The components in FIG. 3 having similar functions as of the first embodiment are denoted by corresponding reference numerals, and description therefor will be simply omitted. Instead, those portion having different functions will be explained in greater detail.

As shown in FIG. 3, in the optical deflector of this embodiment, the movable element 11 of the oscillating system 160, the torsion spring 14, the supporting member 15, the reflection surface 22 and the piezoelectric resistance 16 all have similar materials, structures and functions as those of the first embodiment. However, although the first embodiment uses a pair of torsion springs 14, this embodiment uses a single torsion spring 14. Furthermore, as shown in the drawing, the supporting member 15 of the oscillating system 160 is fixed to the stationary member 150 at a junction 155, such that the oscillating system 160 has a cantilever structure with respect to the stationary member 150 to which the supporting member 15 is fixed. At the junction 155, an adhesive agent having good heat insulating characteristic is used, such that there is good heat insulating characteristic between the oscillating system 160 and the stationary member 150.

This embodiment further differs from the first embodiment in that the driving means comprises a movable coil 18 fixed to the movable element 11, as shown in the drawing, and permanent magnets 153 which are fixed to the stationary member 150 side and which are disposed beside the oscillating system 160, with magnetic pole arrangement such as shown in the drawing. The movable coil 18 can be formed on the movable element 11 by electric plating of copper. The wire for the movable coil 18 may have a thickness 5 µm and a width 10 µm, with a wire spacing of 5 µm. Although in FIG. 3 the number of windings for the coil 18 is reduced for schematic illustration, actually the coil has 5 windings. With regard to the driving of the movable element 11, the two permanent magnets 153 produce a uniform magnetic field inside the plane of the sheet of FIG. 3 and in a direction perpendicular to the torsional axis 17, which magnetic field acts on the AC current that flows through the movable coil 18 to produce a torque about the torsional axis 17.

In the driving means of this embodiment, basically similar to the first embodiment, the frequency adjustment having been explained with reference to FIG. 4 can be done in response to a change in environment temperature, for example. Namely, in this embodiment, a temperature adjusting AC electric current is applied to the movable coil 18, in place of the stationary coil 152, from the driving circuit 156 and through an electrode pad 154, by which the frequency adjustment described with reference to FIG. 4 can be accomplished.

In this embodiment as well, the movable coil 18 of the driving means is used to perform the heating and, as a result of it, the process of separately providing a heating element such as a heater wire for frequency adjustment can be avoided. Hence, the optical deflector can be manufactured at reduced cost.

Furthermore, in this embodiment, the oscillating system 160 has a cantilever structure with respect to the supporting member 15 which is bonded to the stationary member 150. As a result of it, substantially no stress is transmitted from the stationary member 150 to the oscillating system 160. Therefore, deformation of the movable element 11 can be prevented effectively. Additionally, among major factors that cause temperature change of the natural oscillation mode frequency f0 having been described with reference to the first embodiment, there is almost no stress in the torsional axis direction 17. Hence, the frequency of the oscillating system 160 can be adjusted without being influenced by the physical property of the stationary member 150.

On the other hand, in this embodiment, the movable coil 18 which is a source of heating is disposed in the oscillating system 160. Therefore, the heat generation of the movable coil 18 can be utilized for temperature rise of the oscillating system 160 and, thus, the voltage consumption can be reduced further. Particularly, since the wire for the movable coil 18 is disposed on the torsion spring 14, the temperature of the torsion spring portion which is most influential to the temperature change of the frequency f0 of the natural oscillation mode can be changed more effectively.

Furthermore, since the oscillating system 160 has a cantilever structure with respect to the supporting member 15 bonded to the stationary member 150, the path along which the heat is released by heat conduction is defined only along the single torsion spring 14. Therefore, as compared with the structure having two paths, the heat resistance is large and the electric voltage consumption for the temperature adjustment of the movable coil 18 can be made smaller. Additionally, since a single torsion spring 14 is used, the supporting member 15 can be made smaller and the thermal capacity is made smaller. Hence, the voltage consumption for temperature adjustment is reduced further. Moreover, since there is only one junction 155 and, yet, an adhesive agent having good heat insulating property is used there, good heat insulation is provided which further reduces the power consumption for the temperature adjustment. As a result, the time necessary for temperature adjustment can be shortened.

In this embodiment as well, since the oscillating system 160 can be made of monocrystal silicon, it has good heat conductivity and uniform temperature rise of the oscillating system 160 can be accomplished easily through the heat generation at the movable coil 18.

Embodiment 3

Figure 5:
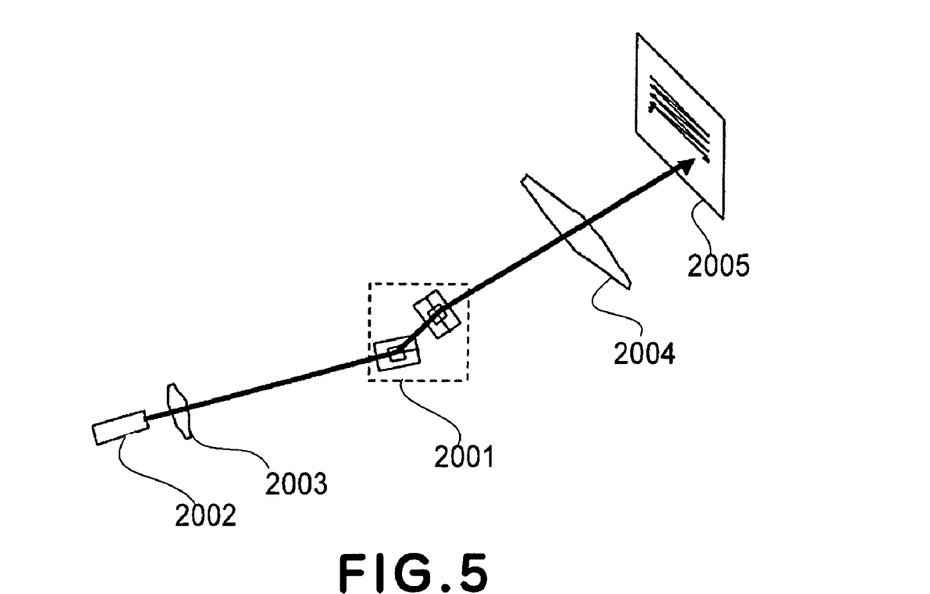
FIG. 5 is a schematic and perspective view for explaining an embodiment of optical instrument wherein an optical deflector of the present invention is used.

FIG. 5 is a schematic and perspective view, showing an embodiment of optical instrument having an optical deflector of the present invention. Here, an image display device is illustrated as an example of optical instrument.

In FIG. 5, denoted at 2001 is an optical deflector group that comprises a pair of optical deflectors. Each optical deflector is controlled in accordance with an optical deflector control method according to the present invention. The optical deflector group 2001 functions to scanningly deflect an input light so as to raster scan a projection plane 2005 with the deflected light. Denoted at 2002 is a laser light source, and denoted at 2003 is a lens or lens group. Denoted at 2004 is a writing lens or lens group. The laser light emitted from the laser light source 2002 has been intensity-modulated in a predetermined manner in association with the timing of optical scan, and it is scanned two-dimensionally by means of the optical deflector group 2001. The laser light thus scanned is projected by the writing lens 2004 to form an image on the projection plane 2005.

Where an optical deflector of the present invention is used, although it is a compact and low power consumption optical deflector based on resonance, the light can be deflectively scanned in raster scan fashion. Thus, by using the optical deflector of the present invention, the optical instrument can be reduced both in size and in power consumption and, additionally, stable image display is accomplished regardless of external factors such as temperature.

Embodiment 4

Figure 6:
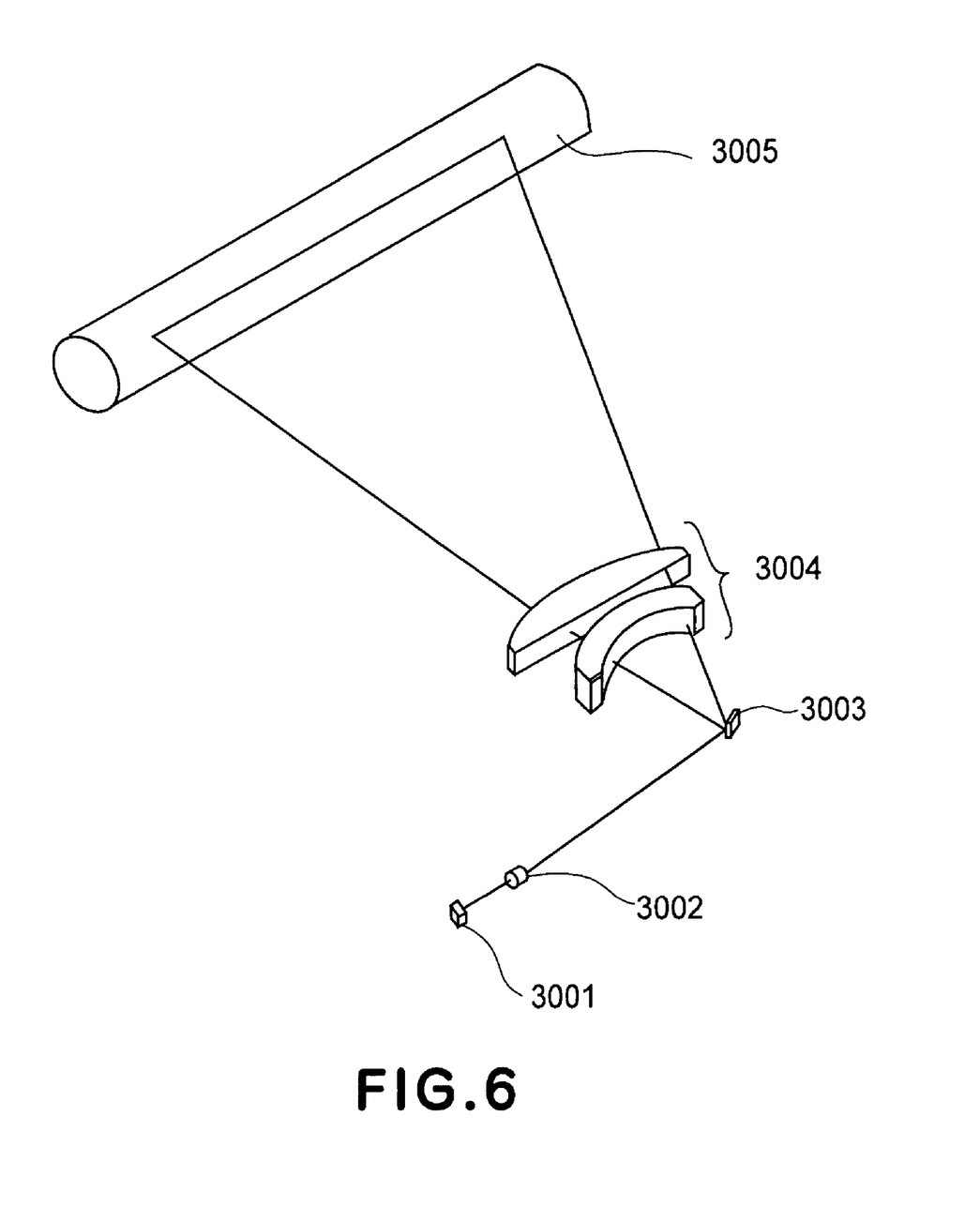
FIG. 6 is a schematic and perspective view for explaining another embodiment of optical instrument wherein an optical deflector of the present invention is used.

FIG. 6 is a schematic and perspective view, showing another embodiment of optical instrument having an optical deflector of the present invention. Here, an image forming apparatus is shown as an example of optical instrument.

In FIG. 6, denoted at 3003 is an optical deflector wherein the frequency thereof can be adjusted in accordance with a control method having been described with reference to the preceding embodiments. In this embodiment, this optical deflector functions to scan an input light one dimensionally. Denoted at 3001 is a laser light source, and denoted at 3002 is a lens or lens group. Denoted at 3004 is a writing lens or lens group, and denoted at 3005 is a drum-shaped photosensitive member. The laser light emitted from the laser light source has been intensity-modulated in a predetermined manner in association with the timing of deflective scan of the light, and it is scanned one-dimensionally by means of the optical scanning system (optical deflector) 3003. The laser light thus scanned is projected by the writing lens 3004, to produce an image on the photosensitive member 3005.

The photosensitive member 3005 is rotatable about a rotational axis extending in a direction perpendicular to the scan direction, and it is uniformly charged by means of a charging device, not shown. By scanning the drum surface with light, an electrostatic latent image is formed in the portion scanned by the light. Subsequently, the electrostatic latent image is developed into a toner image by a developing device, not shown. The toner image is then transferred to a paper transfer sheet, not shown, and then it is fixed, whereby an image is produced on the paper sheet.

By using an optical deflector or a control method therefor according to the present invention, the optical instrument can be made small in size and power consumption. Additionally, stable image formation can be accomplished regardless of external factors such as temperature.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2005-337075 filed Nov. 22, 2005, for which is hereby incorporated by reference.

What is claimed is:

1. An oscillating device, comprising:
   a movable element;
   a supporting member;
   a resiliently supporting portion;
   a coil for driving said movable element; and
   a driving circuit connected to said coil, for supplying an electric current to said coil;
   wherein said movable element is resiliently supported relative to said supporting member by said resiliently supporting portion, for oscillation about a an oscillation axis, and
   wherein said driving circuit is configured to superposedly apply, to said coil, a driving electric current for driving said movable element and a heating electric current of a frequency different from a frequency of natural vibration mode of said movable element.

2. An oscillating device according to claim 1, further comprising a sensor for detecting a displacement angle of said movable element, wherein said driving circuit supplies a heating electric current to said coil on the basis of a signal from said sensor so that an oscillation frequency of said movable element comes close to a target oscillation frequency.

3. An oscillating device according to claim 1, further comprising a temperature sensor for measuring a temperature of said oscillating device, wherein said driving circuit supplies a heating electric current to said coil on the basis of a signal from said temperature sensor so that an oscillation frequency of said movable element comes close to a target oscillation frequency.

4. An oscillating device according to claim 1, wherein said resiliently supporting portion includes one or two torsion springs, and wherein said movable element is resiliently supported by said one or two torsion springs for torsional vibration about a torsional axis, corresponding to said oscillation axis.

5. An oscillating device according to claim 1, wherein said supporting member is provided on a stationary member having a cantilever structure for fixing said supporting member.

6. An oscillating device according to claim 1, wherein said coil is provided on said movable element, and wherein said oscillating device comprises driving means which includes said coil and a permanent magnet disposed on a stationary member for holding said supporting member.

7. An oscillating device according to claim 1, wherein said coil is provided on said stationary member, and wherein said oscillating device comprises driving means which includes said coil and a permanent magnet disposed on said movable element.

8. An oscillating device according to claim 1, wherein said movable element, said resiliently supporting portion and said supporting member are made of monocrystal silicon integrally.

9. An oscillating device according to claim 1, wherein said movable element has a reflection surface and provides an optical deflector for changing a direction of reflection of light incident thereupon.

10. An optical instrument, comprising:
    a light source; and
    an oscillating device as recited in claim 9;
    wherein light from said light source is deflected by said oscillating device, such that at least a portion of the deflected light is projected on an image display member or a photosensitive member.

11. A method of controlling an oscillating device having a movable element, a supporting member, a resiliently supporting portion, a coil for driving the movable element, and a driving circuit connected to the coil, for supplying an electric current to the coil, said method comprising the steps of:
    supplying, to the coil, an electric current for diving the movable element;
    detecting, though a sensor, a displacement angle of torsion vibration of said movable element;
    calculating, on the basis of the detection through the sensor, an electric current level corresponding to a heating temperature necessary for bringing an oscillation frequency of said movable element close to a target oscillation frequency; and
    supplying, to the coil and in accordance with the calculated electric current level, a heating electric current of a frequency different from a frequency of natural oscillation mode of the movable element.

12. A method of controlling an oscillating device having a movable element a supporting member, a resiliently supporting portion, a coil for driving the movable element, and a driving circuit connected to the coil, for supplying an electric current to the coil, said method comprising the steps of:
    supplying, to the coil, an electric current for driving the movable element;
    detecting a temperature of said oscillating device through a temperature sensor;
    calculating, on the basis of the detection through the temperature sensor, an electric current level corresponding to a heating temperature necessary for bringing an oscillation frequency of said movable element close to a target oscillation frequency; and
    supplying, to the coil and in accordance with the calculated electric current level, a heating electric current of a frequency different from a frequency of natural oscillation mode of the movable element.

* * * * *

UNITED STATES PATENT AND TRADEMARK OFFICE
CERTIFICATE OF CORRECTION

PATENT NO. : 7,436,566 B2
APPLICATION NO. : 11/603060
DATED : October 14, 2008
INVENTOR(S) : Takahisa Kato et al.

Page 1 of 1

It is certified that error appears in the above-identified patent and that said Letters Patent is hereby corrected as shown below:

COLUMN 11
    Line 14, "a an oscillation" should read --an oscillation--.

COLUMN 12
    Line 21, "diving" should read --driving--; and
    Line 35, "element a" should read --element, a--.

Signed and Sealed this

Eighteenth Day of August, 2009

David J. Kappos
*Director of the United States Patent and Trademark Office*